United States Patent [19]

Bennett

[11] Patent Number: 4,691,280
[45] Date of Patent: Sep. 1, 1987

[54] HIGH PERFORMANCE MULTI-PROCESSOR SYSTEM

[75] Inventor: William S. Bennett, Binghamton, N.Y.

[73] Assignee: The Singer Company, Binghamton, N.Y.

[21] Appl. No.: 812,556

[22] Filed: Feb. 18, 1986

Related U.S. Application Data

[63] Continuation of Ser. No. 393,204, Jun. 28, 1982, abandoned.

[51] Int. Cl.<sup>4</sup> ............................................. G06F 15/16
[52] U.S. Cl. ................................................... 364/200
[58] Field of Search ... 364/200 MS File, 900 MS File

[56] References Cited

U.S. PATENT DOCUMENTS

| | | |
|---|---|---|
| 4,093,981 | 6/1978 | McAllister et al. ............... 364/200 |
| 4,141,067 | 2/1979 | Mclagan .......................... 364/200 |
| 4,371,929 | 2/1983 | Brann et al. ...................... 364/200 |
| 4,400,771 | 8/1983 | Suzuki et al. ..................... 364/200 |
| 4,418,382 | 11/1983 | Larson et al. ..................... 364/200 |
| 4,426,681 | 1/1984 | Bacot et al. ...................... 364/200 |
| 4,433,375 | 2/1984 | Vinot .............................. 364/200 |
| 4,445,174 | 4/1984 | Fletcher .......................... 364/200 |
| 4,467,436 | 8/1984 | Chance et al. .................... 364/200 |

Primary Examiner—Eddie P. Chan
Attorney, Agent, or Firm—Douglas M. Clarkson; Barry L. Haley

[57] ABSTRACT

The disclosure describes a system of connecting a plurality of independently operable data processor systems to obtain a substantial increase in power and flexibility. Each of the pluralities of independently operable systems has its own memory, and the respective memories are accessible by a data transfer controller connected to each memory by a common bus. Since all data transfer activity is controlled by the data transfer controller, there is no need for any communication between respective independently operable data processor systems, and in one embodiment of the invention, the data transfer controller has its own separate memory to store data temporarily as it becomes available in one memory which will be needed by another data processor system.

7 Claims, 3 Drawing Figures

HIGH PERFORMANCE MULTI-PROCESSOR SYSTEM

This is a continuation, of application Ser. No. 393,204, filed 6/28/82, now abandoned.

BACKGROUND OF THE INVENTION

The present invention, generally, relates to data processing systems and, more particularly, to an interconnection arrangement for a plurality of data processing systems.

As used herein, a "microprocessor" circuit is a small electronic chip that is capable of performing a multitude of computer functions reliably and efficiently. Such a microprocessor chip may be used for the data processor, described hereinafter.

It is recognized that, even though a present-day microprocessor circuit is capable of performing assigned tasks faster than even much larger computers of a few years ago, there are instances in the process controls industry, the simulator industry, and in many other industries when still more performance is needed. In the past, connecting two or more of such microprocessor circuits together has provided the needed additional data processing power.

However, as the number of such interconnected microprocessors has grown, the overall processing power has not grown proportionately. Whereas two microprocessors might give twice the processing power of one microprocessor, ten microprocessors connected together might give only seven times the processing power of one microprocessor.

The reason for this degradation is that usually the individual microprocessor circuits must communicate data between one another, and a substantial amount of time is lost in doing this. In one arrangement, the microprocessors send messages across a group of wires, known as a "bus". Control signals, however, must be exchanged first on this bus, to signal that, for instance, microprocessor A has a message for microprocessor E, that microprocessor E is now ready to receive the message, that the message is now on certain other wires of the bus, that the message has been received, and so on. In most such arrangements, this exchange of control signals must occur for each character, or computer "word", of information to be passed.

In another arrangement, all microprocessors have access through a common bus to a common memory, in which all information or data required by any of the microprocessors is placed. The microprocessors must then send signals across the bus requesting permission to write data into the memory or to read data out. In the process, they often contend for the bus (and for the memory) at the same instant, and one must wait for the other, often by means of a complex priority arbitration scheme and circuitry.

Many other arrangements are possible, including one in which each microprocessor has a certain amount of private memory in addition to the common memory. In such arrangements, any data that is used only by one microprocessor is kept in the private memory of that microprocessor, and only data that is needed by two or more microprocessors is placed in the common memory.

Often it is found, however, that even with this arrangement, when enough microprocessors are added to the bus, some microprocessors will be completely prevented from attaining access to the common memory. When this happens, the overall computing task cannot be completed.

In part, this effect stems from the random timing of the requests for access to the bus and to the common memory acting in concert with the priority arbitration circuits. In situations where the random timing of requests can be replaced by a fixed schedule of requests, a design often can be set up in which all required accesses have defined time slots and will be attained.

This arrangement, however, would normally require that the programs for all microprocessors be developed and synchronized carefully so that each microprocessor made its request at precisely the right instant. If the requests are scattered throughout each program, this places a very difficult burden on the program, and synchronization is difficult or impossible to retain when the design of the program, for other reasons, must change.

A variation of this arrangement establishes a series of time frames in which computing by all microprocessors occurs, separated by periods in which substantially no computing occurs, but data transfers to and from the common memory occur. Such a system can be used by processes in which a periodic exchange of data is consistent with the computation being performed, a condition which does exist in the simulation industry or in other industries.

When program changes occur, however, and especially when those program changes require different accesses to the common memory, then all or most of the programs for the various microprocessors that perform the data interchange must be changed also, because a change in one part of the interchange schedule affects all other parts. This destroys a very desirable property of the programs for the various microprocessors, that is, their independence from changes in other microprocessors.

This independence can be restored through the use of this invention. Each microprocessor is provided with a private memory, and there is also a common memory. However, all of the microprocessors do not access the common memory directly, and the program for these microprocessors need not concern themselves with the data interchange.

A separate microprocessor is dedicated to accomplishing all of the data interchange; it is called the "data transfer controller". The data transfer occurs over a special data transfer bus, which connects to each of the private memories through a second port on each of these memories, that is, a separate port from the one by which the individual microprocessor accesses that private memory.

Data transfers on this special data transfer bus are always either from a private memory to the common memory or from the common memory to a private memory. These transfers are initiated and controlled by the data transfer controller.

In one embodiment, the common memory is, in effect, a private memory of the data transfer controller; the data transfer controller accesses the special data transfer bus directly to all the private memories, reading or writing one or another of those memories. As it reads data from one of the private memories, it places that data in a known location in its own private memory, that is, actually the common memory. Later, that data will be read from the common memory by the data transfer controller and written into one or more of the private memories.

The data transfer controller directs this data transfer on a fixed time schedule, which is synchronized with the programs in the various microprocessors by a common clock circuit which interrupts all microprocessors, including the data transfer controller, at regular intervals. In this way the data transfer controller can initiate transfer at times when the transfer will not impact the computations in the individual microprocessors.

In another embodiment, the common memory is connected also to the special data transfer bus. Data in this case also is transferred only from one of the private memories to the common memory or from the common memory to one of the private memories, but in this case, the transfer may occur in blocks under the control of what is commonly known in the art as a Direct Memory Access (DMA) circuit.

The role of the data transfer controller in this embodiment is to perform the setup of the DMA circuit, that is, to instruct the DMA circuit as to the starting addresses of a block of data (in both the private memory and the common memory) and the length of the block of data. Then, the data transfer controller instructs the DMA circuit to begin transferring data.

In both cases, the schedule by which information is moved about the system is built into the program for the data transfer controller, and the schedule does not appear in any of the programs for the individual microprocessors. In the event that a change in the schedule of data transfer is required, only the program in the data transfer controller need be changed.

It is usual in the simulator industry, and in other industries, to provide support programs and data bases which operate offline (that is, which do not operate directly as part of the group of microprocessors considered here). In certain of these support programs and data bases, knowledge is maintained of the data variables produced in each of the individual microprocessors and the data variables required by each of the individual microprocessors.

With this knowledge, these offline programs can develop, essentially automatically, the computer program needed for the data transfer controller. Any program changes involving data transfer in the individual microprocessors would be reflected in the offline data base, and upon running the offline support program, a new data transfer program would result for the data transfer controller.

INVENTION OBJECTS AND SUMMARY

While the partitioning and arranging of various work in order to minimize any need for intercommunication between individual microprocessor systems may be applicable to some industrial processes, it is difficult to achieve to any realistic extent in the simulator industry. Here, the simulation of a physical device, such as an aircraft, requires heavy cooperation among the computations, and the only way the simulator apparatus can be responsive to such interrelated activity is to have each of the individual microprocessor systems communicate readily to share data needed by another microprocessor system.

Accordingly, it is a principal object of the invention to provide, for a multi-processor system in which much interchange of information is desirable or required, a unique interconnection arrangement which reduces to a minimum any slowdown or delay in computation due to data transfer.

It is also an important object of the present invention to provide a multi-processor system which eliminates substantially all direct communication between the plurality of independently-operable data processor systems.

A multi-processor system, in accordance with the present invention, is termed a "high performance" system because more of its time is free for computational work, instead of the idle, time-consuming intercommunications between the respective processor systems. Such a multiprocessor system, arranged in accordance with the principles of the invention, therefore, increases both the data processing power and the flexibility of the intercommunication system through a plurality of independently operable data processor systems, each system having a data processor means and memory means.

The intercommunication system in accordance with the invention controls the transfer of data between each of the plurality of processor systems by extracting data from one memory means that will be needed by another data processor system, by storing such data temporarily in a "common" memory, and by transmitting that data subsequently to the memory means of the other data processor system.

For this purpose, a common data bus connects the memory means of the plurality of data processor systems which have data to be transferred to another, or to other, of the plurality of independently operable data processor systems, to a separate data transfer controller. This separate data transfer controller is connected to the common data bus to control the transfer of data between the respective processor systems which need the data, thereby eliminating substantially all direct communications back and forth between each of the independently operable data processor systems.

BRIEF DESCRIPTION OF THE DRAWINGS

The foregoing, other and further objects, features and advantages of the present invention will appear more fully from the detailed description of the presently preferred embodiment and from the claims appended hereto, when viewed in conjunction with the accompanying drawings, where:

PRESENTLY PREFERRED EMBODIMENTS

In all of the known multi-processor systems, there seems to be many ways to tie the various processor systems together effectively. Such multi-processor systems may contain as few as two independently operable (or individual) data processor systems, or they may contain thirty, or even more, individual data processor systems.

Each individual data processor system can operate independently with its own respective program and data storage and memory, but it is interconnected with the others for data sharing by the use of common memories or data paths. The larger multi-processor systems usually have individual data processor systems located at widely separated sites and connected together to form a communications network.

In such known multi-processor systems, data is transferred between individual data processor systems either serially or, when the individual data processor systems are close enough together physically to each other, data may be shared by way of one or more parallel data paths. In each such instance, the data will include suitable address and other data identifying signals.

In all such multi-processor systems known heretofore, each individual data processor system must compete with other data processor systems for individual data and for access to each other's memory banks. In such systems, whenever increased performance is needed, additional individual data processor systems are added to the over-all multi-processor system.

In accordance with the present invention, it is contemplated that no individual data processor system will have direct access to the memory of any other individual data processor system. An intercommunication system constructed and arranged in accordance with the basic principles of the present invention avoids completely the necessity of one individual data processor system having to compete directly with any other processor system for access to data stored in another's memory.

Figure 1:
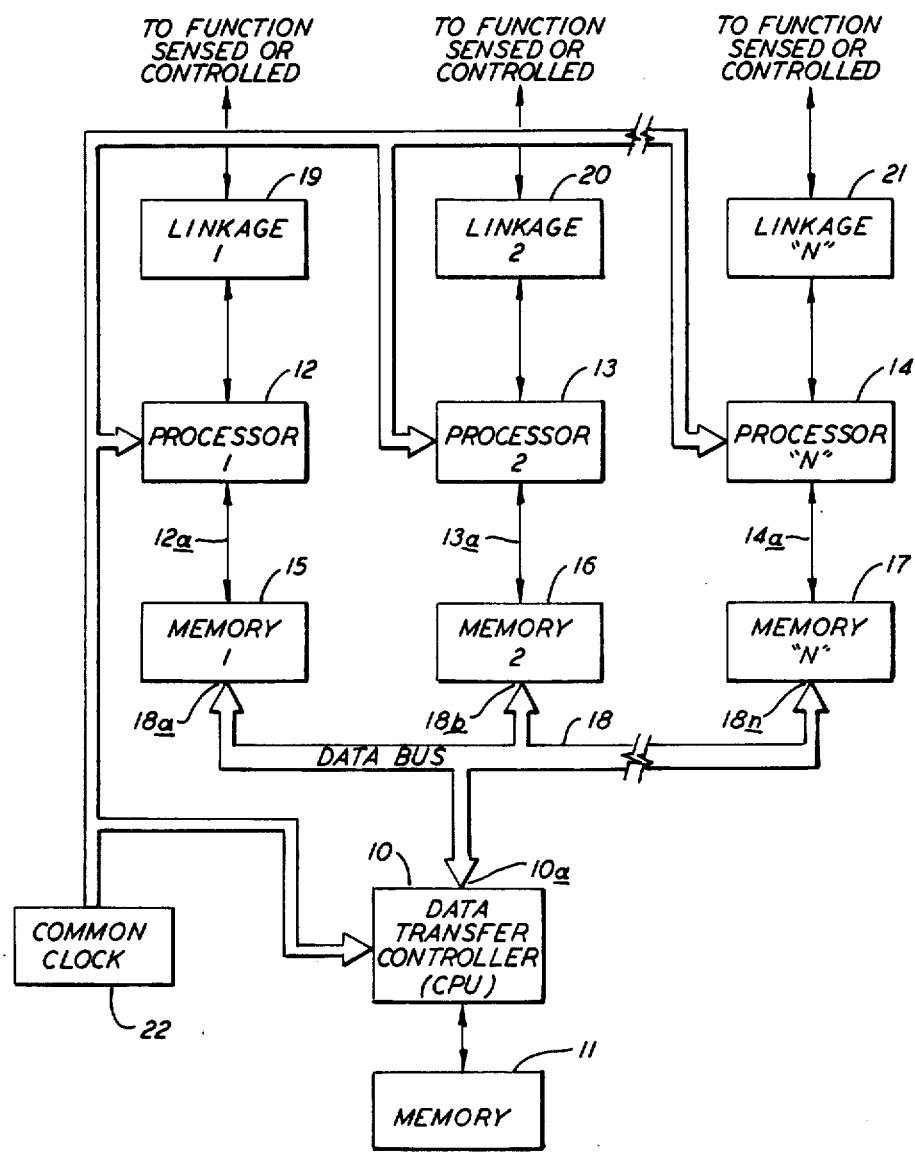
FIG. 1 is a block diagram illustrating the topology of the presently preferred embodiment of the invention.

For a particular situation, having determined the particular number of data processor systems that will be needed to perform the operation contemplated, the invention provides for yet another data processor system, with a suitable program, to function as a data transfer controller, as identified by the reference numeral 10 in FIG. 1. The data transfer controller 10 is devoted entirely to the task of data exchange. The data transfer controller 10 has its own separate memory 11 for storing, temporarily, any data, and for this reason, the separate memory 11 of the data transfer controller 10 can be called a "common" memory.

Connected within the particular multi-processor system, shown in FIG. 1, are any number of independently operable processor systems 12, 13 . . . 14, each with its own individual private memory 15, 16 . . . 17. Each processor system 12, 13 . . . 14 may communicate readily with its respective private memory 15, 16 . . . 17 by means of a "first"n, or private, port 12a, 13a . . . 14a, but there is no provision for, for example, the processor system 12 communicating with the memory 16 of the processor system 13, or even with the memory 17 of the processor system 14.

A common data bus 18 connects to the respective individual private memories 15, 16 . . . 17, through a separate, "second" port 18a, 18b . . . 18n, but the only data processor system also connected to this common data bus 18 is the data transfer controller 10. The data transfer controller 10, including its own private separate memory 11, has access through a port 10a, through the common data bus 18, and through the respective separate (or "second") ports 18a, 18b . . . 18n to all of the individual private memories 15, 16 . . . 17 in order to take data for temporary storage in the "common" memory 11, or to write data from the "separate" common memory 11 to the individual memories 15, 16 . . . 17.

After the data transfer controller 10 has collected the various data from the several operating memories for its own separate "common" memory 11, the data transfer controller 10, then, makes available by means of the common data bus 18 all of that data needed by any other memory circuit for furnishing to its respective data processor system. Accordingly, with an arrangement in accordance with the invention, there is no need for direct communication between the respective processor systems.

Each respective processor system 12, 13 . . . 14 is connected to a particular, predetermined and preselected "function to be sensed and/or controlled" through a suitable linkage arrangement 19, 20 . . . 21. The nature of the particular arrangement for each linkage 19, 20 . . . 21 is determined by the form of the particular function to which each is connected.

The particular program for the data transfer controller 10 makes it known what data will be needed and where it is stored. Clearly, data is different, and different data is needed at different times by different ones of the respective data processor systems. Data generated at a higher rate by one of the processor systems 12, 13 . . . 14 will be picked up by the data transfer controller 10 more frequently and will be delieverd at that rate through the common data bus 18 to be available more frequently to those other memory circuits which have a need for it.

For example, calculations which occur five times a second can wait longer to be picked up than a calculation occurring fifty times a second. In other words, data generated at the higher rates is picked up more frequently. Data pickup and delivery, therefore, requires quite a schedule which, according to one aspect of the invention, is predetermined and placed in an offline data base called a Symbol Dictionary, (not shown).

Such a Symbol Dictionary can then be used by an offline computer which takes that data, builds the schedule, and generates automatically a program to control the operation of the data transfer controller 10. The building of the Program is an automatic process, and both the means and the method are well-known in the art.

The benefits of an arrangement interconnected in accordance with the invention are several, including (1) each individual data processor system communicates directly only with its own memory, and (2) no time is wasted intercommunicating directly between one data processor system and the memory of another data processor system. Another benefit which permits an increase in performance is that (3) the only memory locations which the data transfer controller 10 wants access to are those locations containing data that will be needed by another processor system, and in the simulator industry, this is limited to in the order of five percent (5%) to ten percent (10%) of the total number of data storage locations. Another benefit is that (4) an arrangement in accordance with the invention provides low loading due to communication tasks on each individual data processor system, resulting in each data processor system being free to work at more nearly its full capacity.

The arrangement of the invention operates synchronously, operating on a fixed schedule and interchanging data at that fixed rate. The data processor systems 12, 13 . . . 14 start to work only after they get their respective data.

Therefore, a common clock or periodic interrupt is needed to ensure this synchronous operation. A common clock 22 is indicated as being connected to each processor.

Figure 2:
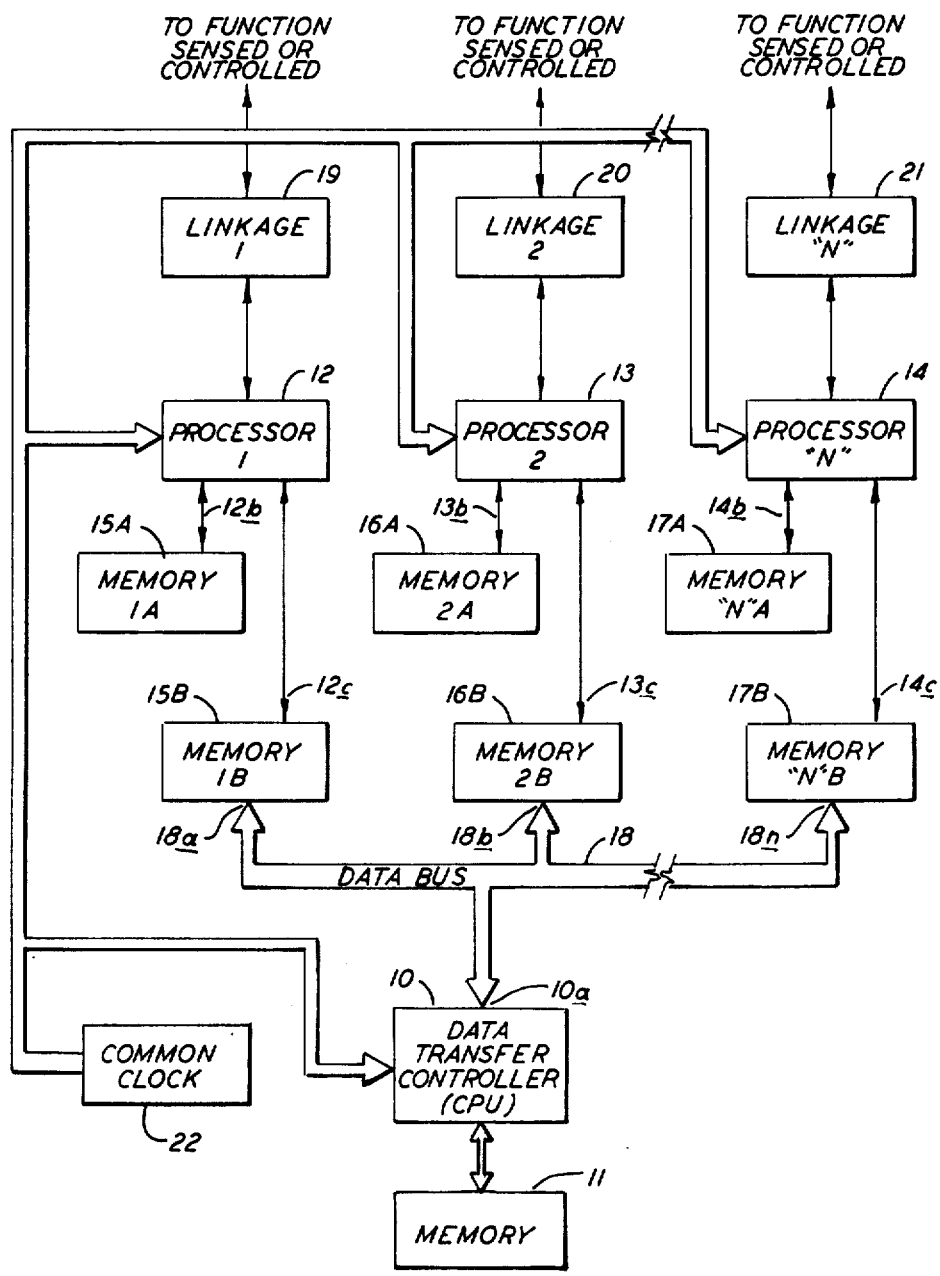
FIG. 2 is a block diagram illustrating a modification of the invention.

Referring now to FIG. 2 of the drawings, the same reference numerals are used to identify the same or similar component parts. A principal distinction between the circuit arrangement shown in FIG. 2 over that shown in FIG. 1 is that each individual private memory 15, 16 . . . 17 has been divided into two distinct memories, each memory being accessible by its respective data processor system through first ports 12b and 12c, 13b and 13c, and 14b and 14c, respectively. These memories are identified by the numerals 15A, 15B, 16A, 16B . . . 17A and 17B.

The circuit arrangement shown in FIG. 2 is for those installations where the data processor systems 12, 13 . . . 14 require at least some memory for their respective individual use, without it being accessible by the data transfer controller 10. In such an instance, any data that will be required by any other data processor system will be stored in the respective memories 15B, 16B . . . 17B for access by the data transfer controller 10 through a second port 18a, 18b and 18n, respectively. Like the circuit shown in FIG. 1, the circuit in FIG. 2 has a common clock 22 in order to ensure that the respective component parts will operate synchronously.

Figure 3:
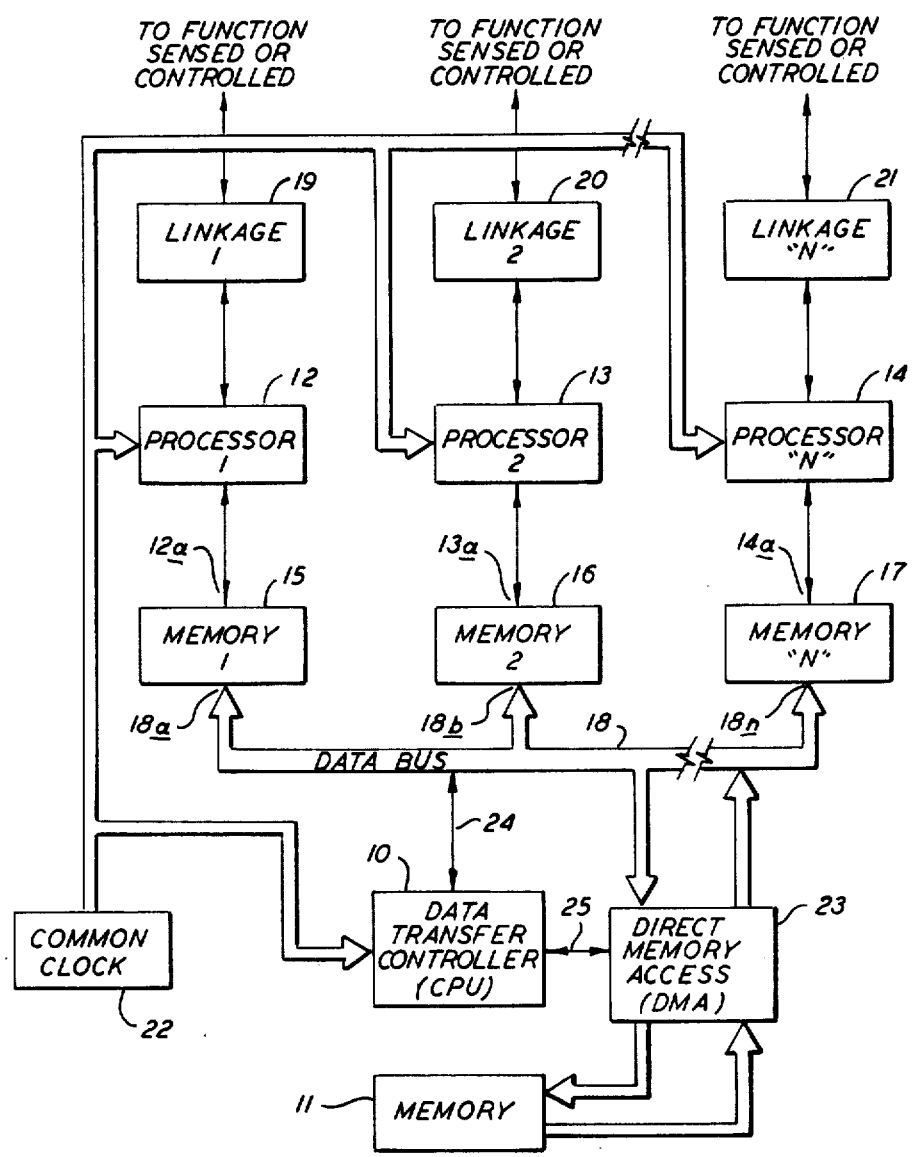
FIG. 3 is a block diagram illustrating another modification of the invention.

Referring now to FIG. 3 of the drawings, here again the same reference numerals are used to identify the same or similar component parts.

In this view, a suitable device 23, identified also as a Direct Memory Access (DMA) because such a component is well known in the art, is shown under the control of the data transfer controller 10 as data moves from the common data bus 18 to the separate "common" memory 11 and back again. The data transfer controller 10 does any "talking" and "interrogating" that it may be programmed to do over a connection 24 directly with the memories 15, 16 . . . 17 through the common data bus 18.

The data transfer controller 10, however, by means of a connection 25, perferrably instructs the DMA 23 to (1) begin reading the particular data at a certain location in a memory, (2) pass the data over the bus 18, (3) write the data beginning at a specific location in the "common" memory, and (4) continue to do this for a certain number of words of data. Alternatively, it may be told to transfer data in a similar manner from the "common" memory 11 to an individual memory 15, 16, . . . 17.

It is contemplated also that the separate DMA 23, shown in FIG. 3, is applicable also with the separated individual private memory concept described hereinabove in connection with FIG. 2 of the drawings. Actually, the DMA 23, shown in FIG. 3, is applicable also with the separate (or "second") port concept for each private memory of the respective data processor systems described hereinabove in connection with FIG. 1 of the drawings.

Although the invention has been described using memory circuits, processor systems and other specifically identified circuit components, it may be practiced also by using the logic element in a digital computer along with proper programs for various other and different aspects of the overall circuit, without departing from the basic inventive concept. The processor system circuit may be, for example, one of the newer miniprocessors or even a microprocessor circuit if desired. Any number of combinations of computer logic and hardware are possible without deviating from the true spirit and scope of the present invention, which is defined by the claims appended hereto.

I claim:

1. A hign performance multi-processor system having increased data processing power and having an intercommunication system with increased flexibility, comprising:

a plurality of independently operable processor systems;

each of said of said plurality of processor systems includes a data processor means and a private, dual-port memory means;

means in each of said plurality of processor systems connecting its respective data processor means with a first port of its private, dual-port memory means;

data transfer controller means having a separate memory means;

common bus means connecting a second port of each private dual-port memory means to said data transfer controller means and to said separate memory means; and clock means connected to each one of said plurality of processor systems, including said data transfer controller means for providing timing signals thereto;

said data transfer controller means direct data transfer on a fixed time schedule, which is synchronized with the execution of programs in said plural data processor means by said clock means, said data transfer is transferred synchronously from any one of said private, dual-port memory means to said separate memory and from said separate memory means to another one of said private, dual-port memory means, all data transfer being controlled by said data transfer controller means, so that operation of said plurality of data processor means is independent of such data transfer.

2. A high performance multi-processor system as defined in claim 1 wherein each of said memory means is divided into first and second parts, both parts of which including means for access by respective data processor means, and only one part being said private, dual-port memory means connected for access by said data transfer controller means through said common bus means connected only with said second port.

3. A high performance multi-processor system as defined in claim 2 including direct memory access gate means connected to be controlled by said data transfer controller means for controlling the transfer of data between said common bus means and said private, dual-port memory means.

4. A high performance multi-processor system as defined in claim 1 wherein said said separate memory means is connected to store temporarily only that data the transfer of which is controlled by said data transfer controller means.

5. A high performance multi-processor system as defined in claim 3 wherein said gate means is connected between said common bus means and said separate memory means, and means connected between said gate means and said data transfer controller means for controlling said gate means, thereby effectively controlling said data transfer.

6. A high performance multi-processor system as defined in claim 1 including DMA means connected to receive data from said common bus means responsive to instructions from said data transfer controller means, said separate memory means connected to receive data from said DMA means and to transmit data to said common bus means through said DMA means in response to instructions from said data transfer controller means, and said clock means connected to said data transfer controller means and to each one of said data processor means to ensure that the operation of said multi-processor system will be synchronous.

7. A high performance multi-processor system as defined in claim 1 wherein each of said respective private, dual-port memory means is divided into first and second parts, said first port being connected between said respective data processor means and the first part of said respective memory means, and said second port being connected between said common bus means and the second part of said respective memory means.

* * * * *